(12) United States Patent
Hasunuma (10) Patent No.: US 8,210,204 B2
(45) Date of Patent: Jul. 3, 2012

(54) SOCKET FOR FLUID-TRANSFER COUPLING DEVICE

(75) Inventor: Masahiro Hasunuma, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 1063 days.

(21) Appl. No.: 12/096,074

(22) PCT Filed: Dec. 5, 2006

(86) PCT No.: PCT/JP2006/324619
§ 371 (c)(1),
(2), (4) Date: Jun. 4, 2008

(87) PCT Pub. No.: WO2007/066791
PCT Pub. Date: Jun. 14, 2007

(65) Prior Publication Data
US 2009/0267346 A1    Oct. 29, 2009

(30) Foreign Application Priority Data
Dec. 5, 2005 (JP) .................. 2005-351224

(51) Int. Cl.
*F16L 37/18* (2006.01)
(52) U.S. Cl. .............. 137/614.04; 137/614; 137/312; 137/553; 285/399
(58) Field of Classification Search ........... 137/614.03–614.05, 614, 312, 137/553; 285/305, 307, 315, 316, 399
See application file for complete search history.

(56) References Cited

U.S. PATENT DOCUMENTS

| | | | | |
|---|---|---|---|---|
| 4,344,455 A | * | 8/1982 | Norton et al. | 137/614 |
| 5,649,563 A | | 7/1997 | Shimano | |
| 6,719,270 B2 | * | 4/2004 | Ozawa | 137/614.04 |

FOREIGN PATENT DOCUMENTS

| | | |
|---|---|---|
| JP | 8296782 | 11/1996 |
| JP | 2921654 B | 7/1999 |
| JP | 2002 130574 | 5/2002 |
| JP | 2002 243085 | 8/2002 |
| JP | 2003 42371 | 2/2003 |

(Continued)

OTHER PUBLICATIONS

International Search Report completed Dec. 25, 2006 in International Application No. PCT/JP2006/324619 filed Dec. 5, 2006.

(Continued)

*Primary Examiner* — Kevin Lee
(74) *Attorney, Agent, or Firm* — Millen, White, Zelano & Branigan, P.C.

(57) ABSTRACT

A socket for a fluid-transfer coupling device (5) that communicates a flow path in the socket with a flow path in a plug (70) since the socket (10) and the plug are connected to each other, includes a mount panel attachment (17) arranged in the vicinity of an entry (19) of the socket allowing the plug to be inserted, and attaching the socket to a mount panel (18) and a support (35) arranged in a different position from the entry and supporting the socket. Consequently, the socket can be stably supported on the mount panel even if the flow rate of fluid is large. It is preferable that at least one part of the socket is constructed in a spigot-and-socket manner.

5 Claims, 11 Drawing Sheets

FOREIGN PATENT DOCUMENTS

JP    2003 148674    5/2003

OTHER PUBLICATIONS

ESPEC CORP., "Quick joint and attachement," Patent Abstracts of Japan, Publication Date: Feb. 13, 2003; English Abstract of JP-2003 042371.

Kit KK., "Piping connecting coupling and automatic piping switching device," Patent Abstracts of Japan, Publication Date: May 21, 2003; English Abstract of JP-2003 148674.

Pascal Corp., "Coupling device with washing function," Patent Abstracts of Japan, Publication Date: Aug. 28, 2002; English Abstract of JP-2002 243085.

* cited by examiner

SOCKET FOR FLUID-TRANSFER COUPLING DEVICE

TECHNICAL FIELD

The present invention relates to a socket for a fluid-transfer coupling device which is used in transferring fluid from a storage tank in a production plant to a container on a carrier track. The fluid to be transferred may be a liquid (e.g. high-purity chemicals as typified by an etching liquid used in manufacturing semiconductors), gas or other fluids.

BACKGROUND ART

Japanese Patent Publication No. 2921654 discloses a coupling device used for the above application. Such a coupling device includes a socket (immovable female coupler) and a plug (movable male coupler). Conduits are connected to the socket and the plug, respectively.

The socket is equipped with a circumferential side flange. By attaching the side flange to a mount panel, the socket is secured while being connected to the conduit. When the plug connected to the other conduit is inserted into the socket, the plug and the socket are arranged in a line. With an operation of an inner mechanism built in the socket previously, the respective conduits of the socket and the plug are communicated with each other, so that fluid is transferred.

Generally, the side flange is positioned in the vicinity of the entry to minimize a socket's portion projecting out of the mount panel. Consequently, a socket's portion located on the backside of the mount panel is lengthened relatively. In addition, as the conduit is connected to the socket as mentioned before, the socket is subjected, at its distal end far from the mount panel, to a relatively-large moment of force. Consequently, since a load applied on a joint portion between the mount panel and the side flange gets larger, there arises a possibility that the sealing characteristics is reduced due to the action of the moment.

If the flow rate of fluid flowing through the coupling device is relatively large, the possibility of reducing the sealing characteristics is enhanced furthermore since the load applied on the mount panel is increased to vary the center of the coupling device due to the action of moment.

This invention has been achieved in view of the above situation, and an object thereof is to provide a socket for a fluid-transfer coupling device, which can be stably supported on the mount panel even if the flow rate of fluid is relatively large and which can maintain the sealing characteristics for the long term.

DISCLOSURE OF THE INVENTION

In order to attain the above object, according to a first aspect of the present invention, there is provided a socket for a fluid-transfer coupling device that connects the socket and a plug to each other thereby communicating respective flow paths in the socket and the plug with each other, comprising: a mount panel attachment arranged in the vicinity of an entry of the socket allowing the plug to be inserted thereinto, and attaching the socket to a mount panel; and a support arranged in a different position from the entry and supporting the socket.

According to a second aspect of the invention, there is provided a socket for a fluid-transfer coupling device, which includes a bellows holder for supporting a bellows and a shower ring fixed to the bellow, holder both arranged in a housing so as to be slidable in a longitudinal direction of the housing, the bellows having a conduction valve mechanism arranged in the shower ring at the forward end of the bellows, the shower ring including a circular-sectional cleaning chamber allowing an entrance of a head portion of a plug to be coupled to the socket, the plug having a conduction valve mechanism corresponding to the conduction valve mechanism of the bellows at the forward end of the plug, the shower ring having seal means, such as an O-ring, arranged in the middle of the cleaning chamber and a nozzle hole formed in a sidewall of the cleaning chamber to extend in the tangential direction thereto, the housing having a shower nozzle arranged to supply the nozzle hole with a washing water and a drain hole formed to discharge the water, the socket comprising: a mount panel attachment arranged in the vicinity of an entry of the socket allowing the plug to be inserted thereinto, and attaching the socket to a mount panel; and a support arranged in a different position from the entry and supporting the socket.

In other words, in the first aspect and the second aspect, since the socket is equipped with not only the mount panel attachment, for example, a side flange, but also the support for supporting the socket, it is possible to allow the mount panel to stably support the socket even if the flow rate of fluid is relatively large and also possible to maintain the sealing characteristics for the long term.

According to a third aspect of the invention, as in the first or second aspect, at least one part of the socket is constructed in the form of a spigot type-element and a socket-type element.

In the third aspect of the invention, it is possible to facilitate the centering of components forming the socket when assembling the socket, thereby saving manufacturing time of the socket.

According to a fourth aspect of the invention, as in the second or third aspect, the socket further comprises a position sensor for detecting the position of the bellows holder, wherein the position sensor is arranged in a position where a pressure is unchangeable when the bellows holder slides.

In the fourth aspect of the invention, it is possible to prevent the position sensor from falling off due to pressure when sliding the bellows holder and prevent the sensitivity of the position sensor from being reduced by pressure or the like.

According to the fifth aspect of the invention, there is provided a socket for a fluid-transfer coupling device that connects the socket and a plug to each other thereby communicating respective flow paths in the socket and the plug with each other, wherein at least one part of the socket is constructed in the form of a spigot-type element and a socket-type element.

According to the sixth aspect of the invention, there is provided a socket for a fluid-transfer coupling device, which includes a bellows holder for supporting a bellows and a shower ring fixed to the bellows holder both arranged in a housing so as to be slidable in a longitudinal direction of the housing, the bellows having a conduction valve mechanism arranged in the shower ring at the forward end of the bellows, the shower ring including a circular-sectional cleaning chamber allowing an entrance of a head portion of a plug to be coupled to the socket, the plug having a conduction valve mechanism corresponding to the conduction valve mechanism of the bellows at the forward end of the plug, the shower ring having seal means, such as an O-ring, arranged in the middle of the cleaning chamber and a nozzle hole formed in a sidewall of the cleaning chamber to extend in the tangential direction thereto, the housing having a shower nozzle arranged to supply the nozzle hole with a washing water and a drain hole formed to discharge the water, wherein at least one part of the socket is constructed in the form of a spigot-type element and a socket-type element.

In the fifth and sixth aspects of the invention, it is possible to facilitate the centering of components forming the socket when assembling the socket, accomplishing to save the manufacturing time of the socket.

According to the seventh aspect of the invention, as in the fifth or sixth aspect of the invention, the socket for the fluid-transfer coupling device further comprises: a mount panel attachment arranged in the vicinity of an entry of the socket allowing the plug to be inserted thereinto, and attaching the socket to a mount panel; and a support arranged in a different position from the entry and supporting the socket.

In the seventh aspect of the invention, since the socket is equipped with not only the mount panel attachment, for example, a side flange but also the support for supporting the socket, it is possible to allow the mount panel to stably support the socket even if the flow rate of fluid is relatively large and also possible to maintain the sealing characteristics for the long term.

According to the eighth aspect of the invention, as in the sixth or seventh aspect of the invention, the socket for the fluid-transfer coupling device further comprises a position sensor for detecting the position of the bellows holder, wherein the position sensor is arranged in a position where a pressure is unchangeable when the bellows holder slides.

In the eighth aspect of the invention, it is possible to prevent the position sensor from falling off due to pressure when sliding the bellows holder and prevent the sensitivity of the position sensor from being reduced by pressure or the like.

According to the ninth aspect of the invention, there is provided a socket for a fluid-transfer coupling device, which includes a bellows holder for supporting a bellows and a shower ring fixed to the bellows holder both arranged in a housing so as to be slidable in a longitudinal direction of the housing, the bellows having a conduction valve mechanism arranged in the shower ring at the forward end of the bellows, the socket comprising: a position sensor for detecting the position of the bellows holder, wherein the position sensor is arranged in a position where a pressure is unchangeable when the bellows holder slides.

In the ninth aspect of the invention, it is possible to prevent the position sensor from falling off due to pressure when sliding the bellows holder and prevent the sensitivity of the position sensor from being reduced by pressure or the like.

According to the tenth aspect of the invention, as in the ninth aspect of the invention, the socket for the fluid-transfer coupling device further comprises: a mount panel attachment arranged in the vicinity of an entry of the socket allowing the plug to be inserted thereinto, and attaching the socket to a mount panel; and a support arranged in a different position from the entry and supporting the socket.

In the tenth aspect of the invention, since the socket is equipped with not only the mount panel attachment, for example, a side flange, but also the support for supporting the socket, it is possible to allow the mount panel to stably support the socket even if the flow rate of fluid is relatively large, and also possible to maintain the sealing characteristics for the long term.

According to the eleventh aspect of the invention, as in the ninth or tenth aspect of the invention, at least one part of the socket is constructed in a relationship between a spigot type element and a socket type element.

In the eleventh aspect of the invention, it is possible to facilitate the centering of components forming the socket when assembling the socket, thereby saving manufacturing time of the socket.

According to the twelfth aspect of the invention, as in any of the ninth to eleventh aspects, the shower ring includes a circular-sectional cleaning chamber allowing an entrance of a head portion of a plug to be coupled to the socket, the plug having a conduction valve mechanism corresponding to the conduction valve mechanism of the bellows at the forward end of the plug; wherein the shower ring has seal means, such as an O-ring, arranged in the middle of the cleaning chamber and a nozzle hole formed in a sidewall of the cleaning chamber to extend in the tangential direction thereto; and wherein the housing has a shower nozzle arranged to supply the nozzle hole with a washing water and a drain hole formed to discharge the water.

In the twelfth aspect of the invention, when the cleaning water is ejected from the shower nozzle after inserting the head portion of the plug into the middle of the cleaning chamber, the cleaning water flows along the inner wall of the circular cleaning chamber spirally to clean up the outer circumferential surface of the head portion of the plug. Thus, it is possible to thoroughly and reliably clean the head portion of the plug.

According to the thirteenth aspect of the invention, as in the second, sixth or ninth aspect of the invention, the socket for the fluid-transfer coupling device further comprises a leak sensor for detecting a leakage of fluid to be transferred by the fluid-transfer coupling device, into a sliding chamber allowing the bellows holder to slide therein.

BEST MODE FOR CARRYING OUT THE INVENTION

Embodiments of the present invention will be described below with reference to drawings. In the drawings below, similar elements are indicated with similar reference numerals respectively. For ease of understanding, the drawings have been appropriately modified in scale size.

Figure 1:
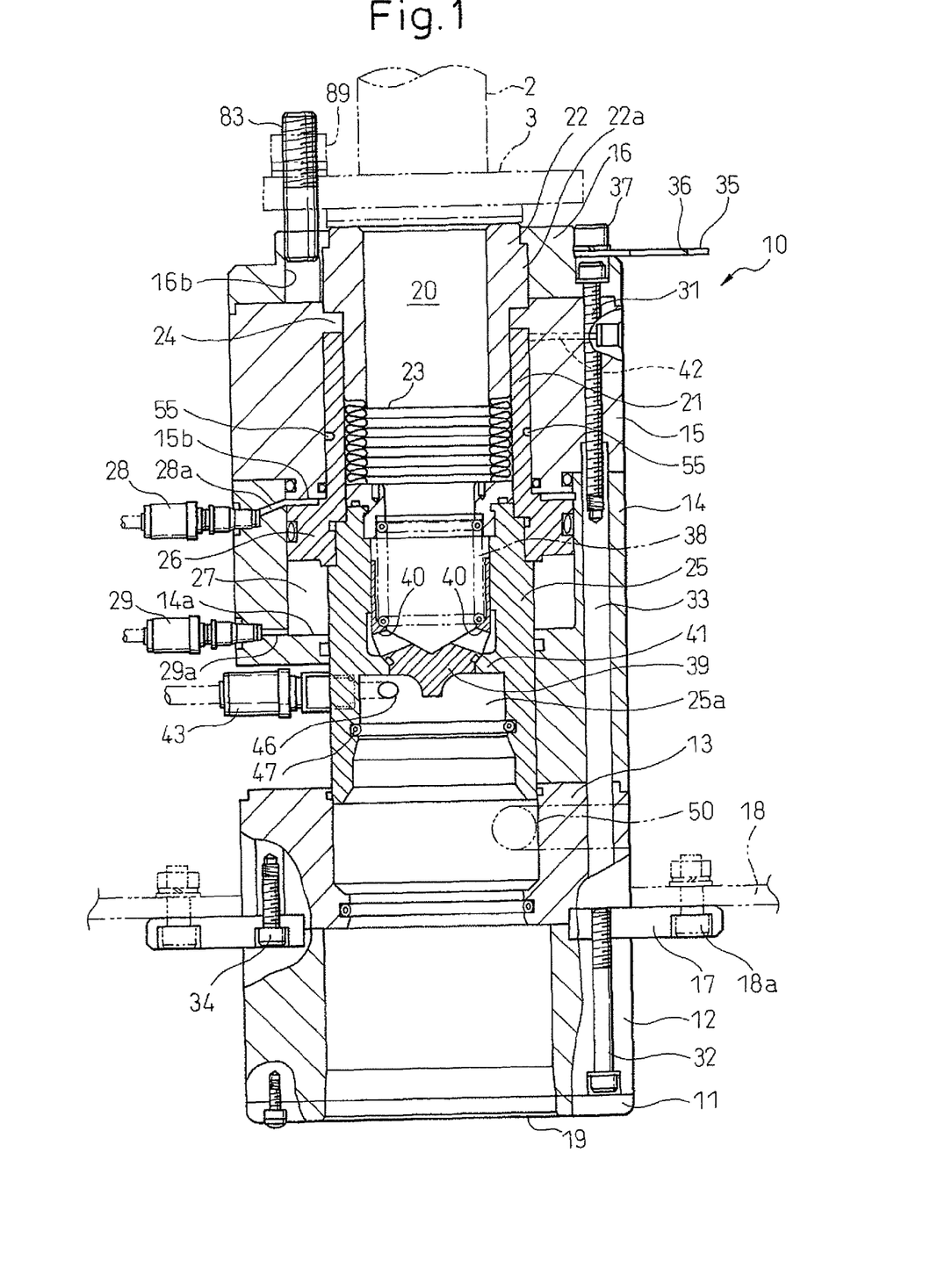
FIG. 1 is a longitudinal sectional view of a socket for a fluid-transfer coupling device in accordance with the present invention.
Figure 2:
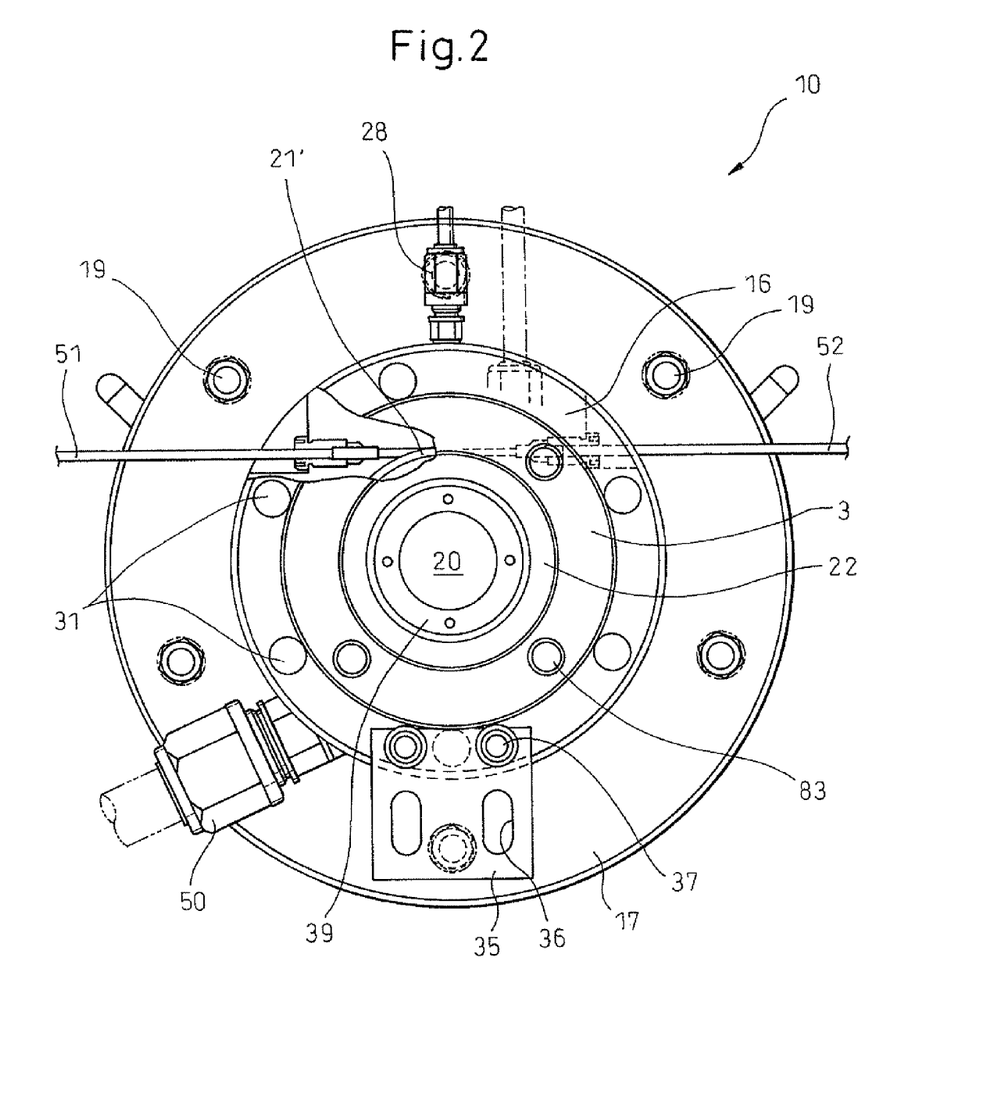
FIG. 2 is an end view of the socket for the fluid-transfer coupling device in accordance with the present invention.

FIG. 1 is a longitudinal sectional view of a socket for a fluid-transfer coupling device in accordance with the present invention, while FIG. 2 is an end view of the socket for the fluid-transfer coupling device of the present invention. A housing of the socket 10 mainly includes housing components 12, 13, 14, 15 assembled to each other integrally. As shown in the figures, the housing component 12 has one end fixed to a front cover 11 and the housing component 15 has one end fixed to a rear cover 16. In the present invention, the housing of the socket 10 is formed by the front cover 11, the housing components 12 to 15 and the rear cover 16. Preferably, these housing components are made from resinous material having chemical resistance, for example, fluorocarbon resin.

As shown in FIG. 1, a side flange 17 is arranged between the housing component 12 and the housing component 13. The side flange 17 serves to fix the socket 10 to a mount panel 18. In addition, a later-mentioned plug 70 is inserted into an entry 19 formed by the housing component 12 and the front cover 11, etc.

In the vicinities of the outer circumferential surfaces of respective end surfaces of the housing components 12 to 15 and the inner circumferential surfaces of end surfaces of the side flange 17, a plurality of holes are formed at regular intervals in the circumferential direction. In assembling the housing of the socket 10, connecting rods 33 are inserted into the holes of the housing components 14, 15 while aligning respective spigot-and-socket portions of the housing components 14, 15 with each other. Then, bolts 34 are inserted into the holes of the side flange 17 and the housing component 13 and screwed into respective one ends of the connecting rods 33. Then, bolts 31 are inserted into the holes of the rear cover 16 and the housing component 15 and screwed into the other ends of the connecting rods 33. Finally, bolts 32 are inserted into the holes of the housing component 12 and screwed into the side flange 17. In this way, the housing of the socket 10 is assembled.

Preferably, the connecting rods are made from metal. This results in an increase in rigidity of the socket 10 as a whole. Therefore, even if a relatively-large load is applied on the side flange 17 by an operator when using the socket 10, there is no possibility that the side flange 17 rotates. Additionally, it is also possible to prevent the occurrence of reduced sealing capability or clattering in the housing of the socket.

As shown in FIG. 1, a bellows holder 21 is slidably arranged along respective inner circumferential surfaces of the housing components 14, 15. A bellows 23 is arranged inside the bellows holder 21. The bellows 23 has one end formed integrally with a proximal end adaptor 22 engaging with the rear cover 16. As shown in the figure, the proximal end adaptor 22 has a broad portion 22a engaged in a concave part formed on the inner circumferential surface of the rear cover 16. As the broad portion 22a also abuts on a step part 24 of the housing component 15, the proximal end adaptor 22 is securely arranged in the socket 10.

On the forward end of the bellows holder 21, a piston 26 in the form of a flange is formed integrally with the outer circumferential surface of the bellows holder 21. As shown in the figure, a sliding chamber 27 is defined between a forward end 15b of the housing component 15 and a step part 14a of the housing component 14, so that the piston 26 integrated with the bellows holder 21 slides in the sliding chamber 27. The step part 14a and the forward end 15b serve as stopper elements for the piston 26. Thus, a distance obtained by subtracting a thickness of the piston 26 from an interval between the step part 14a and the forward end 15b is equivalent to a stroke of the piston 26.

The other end of the bellows 23 is connected to a shower ring 25. The shower ring 25 made from fluorocarbon resin or polyvinyl chloride, etc. is secured on the bellows holder 21. When the piston 26 is sliding, the shower ring 25 slides along the inner circumferential surfaces of the housing components 13, 14. In addition, the bellows holder 21 slides along the inner circumferential surface of the housing component 15 at the sliding of the piston 26. In the vicinity of the step part 24, further, a drain 42 is formed to discharge fluid stored in a sliding chamber 21' of the bellows holder 21.

Further, intake and exhaust ports 28a, 29a are formed so as to extend from both ends of the sliding chamber 27 to the outer circumferential surface of the housing component 14 and also connected to intake and exhaust nozzles 28, 29, respectively. As can be seen from FIG. 1, the piston 26 is arranged, in the sliding chamber 27, between the intake and exhaust ports 28a, 29a. Therefore, if the sliding chamber 27 is supplied with air pressure through the intake and exhaust port 28 in a state of FIG. 1, the piston 26 is pushed by air and slid until its arrival at the step part 14a. At this time, air in the sliding chamber 27 is discharged from the intake and exhaust port 29. When this pneumatic relationship of entrance and exit is switched between the intake and exhaust ports 28, 29, the piston 26 and the bellows holder 21 move toward the proximal end of the socket 10 until they arrive at the forward end 15b and the step part 24, respectively.

In the vicinity of the center of the shower ring 25, a first valve seat 41 is formed so as to project inwardly. A first valve body 39 is urged toward the first valve seat 41 by a spring 38 arranged between the first valve body 39 and the bellows 23. In the normal state, the first valve body 39 closes an opening of the first valve seat 41. Additionally, as shown in the figure, the first valve body 39 is formed with a communication hole 40. When the first valve body 39 is pushed against the urging of the spring 38, the communication hole 40 and the opening of the first valve seat 41 are opened together.

Inside the shower ring 25, a cleaning chamber 25a is formed with a circular section, on the forward end side of the ring 25. In an inner surface of the cleaning chamber 25a, a nozzle hole 46 is formed so as to open in a tangential direction of the cleaning chamber 25a. This nozzle hole 46 is communicated with a shower nozzle 43 fixed to the outer circumference of the shower ring 25. Additionally, the cleaning chamber 25a is provided, on its inner circumferential surface, with a sealing part 47, for example, an O-ring. The cleaning chamber 25a is formed so as to expand in a tapered shape as being headed from the sealing part 47 to the forward end. In the housing component 13, a drain hole 50 is formed so as to extend from the inner circumferential surface to the outer circumferential surface. In operation, cleaning liquid ejected from the nozzle hole 46 is drained through the drain hole 50.

As shown in FIG. 1, two reference marks 55 are formed on the outer circumference portion of the bellows holder 21, in positions opposed to each other. In the embodiment shown in the drawing, the reference marks 55 are notches. However, the reference marks 55 different from notches may be used so long as they do not interfere with the sliding action of the bellows holder 21.

As shown in FIG. 2, position sensors 51, 52 for detecting the position of the bellows holder 21 are attached to the housing of the socket 10, in positions opposed to each other. Specifically, the position sensors 51, 52 are provided in the housing component 15 so that respective tips of the position sensors 51, 52 extend to the inner circumferential surface of the sliding chamber 21' of the bellows holder 21 or just short of the inner circumferential surface. Therefore, even when the bellows holder 21 slides, there is no possibility that the circumferential surface of the bellows holder 21 comes into contact with the position sensors 51, 52.

In this embodiment, the position sensors 51, 52 are optical sensors for detecting the reference marks 55 provided in the bellows holder 21. As mentioned before, as the bellows holder 21 is integrated with the piston 26, the position of the piston 26 can be detected by detecting the position of the bellows holder 21 via the reference marks 55.

In the not-shown prior art, a position sensor for the piston 26 is arranged in the sliding chamber 27 in which the piston 26 slides. If the position sensor is arranged in the sliding chamber 27, however, by pressurizing the sliding chamber 27 through the intake and exhaust ports 28, 29, there is the risk of a position sensor's falling out of the sliding chamber 27. Even if the position sensor does not fall out, there is a possibility that air in the sliding chamber 27 leaks out through the attachment port of the position sensor, causing the pressure in the sliding chamber 17 to be precisely controlled with difficulty. Also, there is a possibility that the sensitivity of the position sensors is reduced when the position sensors are directly influenced due to pressurization in the sliding chamber 27.

On the contrary, according to the present invention, the tips of the position sensors 51, 52 are arranged in an area free from the influence of pressure in the sliding chamber 27, i.e., in the sliding chamber 21' for the bellows holder 21. Additionally, since the drain 42 is formed in the sliding chamber 21' for the bellows holder 21, there is no change in the pressure of the sliding chamber for the bellows holder 21 during the piston's sliding. Thus, in the present invention, the pressure in the sliding chamber 27 is not applied on the position sensors 51, 52 even when the piston 26 is sliding. Therefore, neither falling-out of the position sensors nor reduction in the sensitivity of the position sensors is produced. According to the present invention, furthermore, it is possible to precisely control the pressure in the sliding chamber 27 without air leakage through the attachment places of the position sensors 51, 52 when sliding of the piston 26. Note, as shown in FIG. 2, the position sensors 51, 52 are arranged on the opposite side of a support plate 35 in view from an inside passage 20. When the later-mentioned socket 10 is used, these position sensors 51, 52 are positioned on the upper side of the socket 10. Thus, the reference marks 55 arranged on the outer circumference of the bellows holder 21 are also positioned on the upper side of the socket 10. In such a case, grease movable downwardly in the sliding chamber 21' is unlikely to enter the reference marks 55 (notches) and the position sensors 51, 52 are unlikely to malfunction by inflowing the grease.

As can be seen from FIGS. 1 and 2, additionally, the support plate 35 is fixed to the proximal end of the rear cover 16 by two bolts 37. The support plate 35 is formed with two oval openings 36. As described later, a support shaft 39c can be fixed to the support plate 35 by inserting the other bolts 39b into the openings 36. For this purpose, it is preferable that the support plate 35 is made from material having a relatively-high rigidity.

Figure 3A:
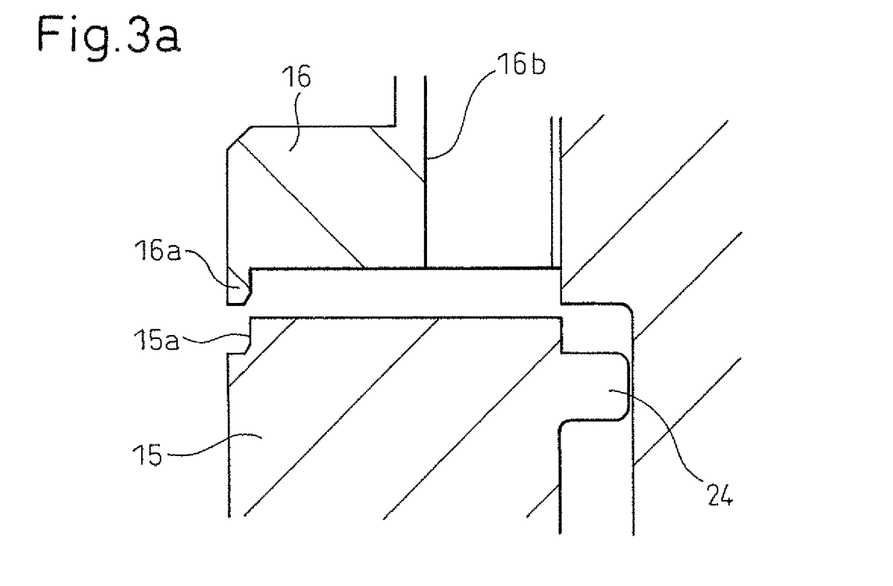
FIG. 3a is a partially-enlarged view showing a proximal end of a housing in enlargement.

According to the present invention, at least part of components forming the housing of the socket 10 is assembled in a spigot-and-socket manner. FIG. 3a is a partially-enlarged view showing the proximal end of the housing in enlargement. In FIG. 3a, a circular projection 16a is formed in the circumferential part of the rear cover 16 in advance. On the other hand, the housing component 15 in abutment with the rear cover 16 is formed with a circular groove 15a for engagement with the circular projection 16a.

In assembling, the housing component 15 is fitted to the rear cover 16 so that the circular groove 15a engages with the circular projection 16a. Consequently, the centering of the housing can be easily accomplished. Similar circular projections and grooves are formed in the other components, for example, the housing components 13, 14, as well. With the easiness in centering these components, by connecting these components 12 to 16 to each other through the bolts 31, 32, it becomes possible to improve the sealing characteristics of the socket 10 and shorten the manufacturing time of the housing.

Additionally, the sliding part in the socket 10, for example, the shower ring 25 and the piston 26 are also assembled to each other in the spigot-and-socket manner. As a matter of course, all immovable components in the socket 10 may be assembled in the spigot-and-socket manner.

It is apparent that sealing parts, for example, O-rings for air-tight and liquid-tight are arranged between the housing of the socket 10 and the sliding part, i.e. the piston 26 and the shower ring 25 or the like and also inside the entry 19 appropriately, although these sealing parts are not described in detail.

Moreover, as shown in FIG. 1, a conduit 2 having a flange 3 is connected to the proximal end of the socket 10. The connection between the socket 10 and the conduit 2 is accomplished by means of a bolt 83 and a nut 89. In the present invention, the bolt 83 is provided with a caulked head portion. Thus, as shown with FIG. 3b as a detail view, before assembling, the bolt 83 is inserted into a hole 16b of the rear cover 16 and thereafter, the head portion 83a is flattened under pressure in the hole 16b.

Figure 3B:
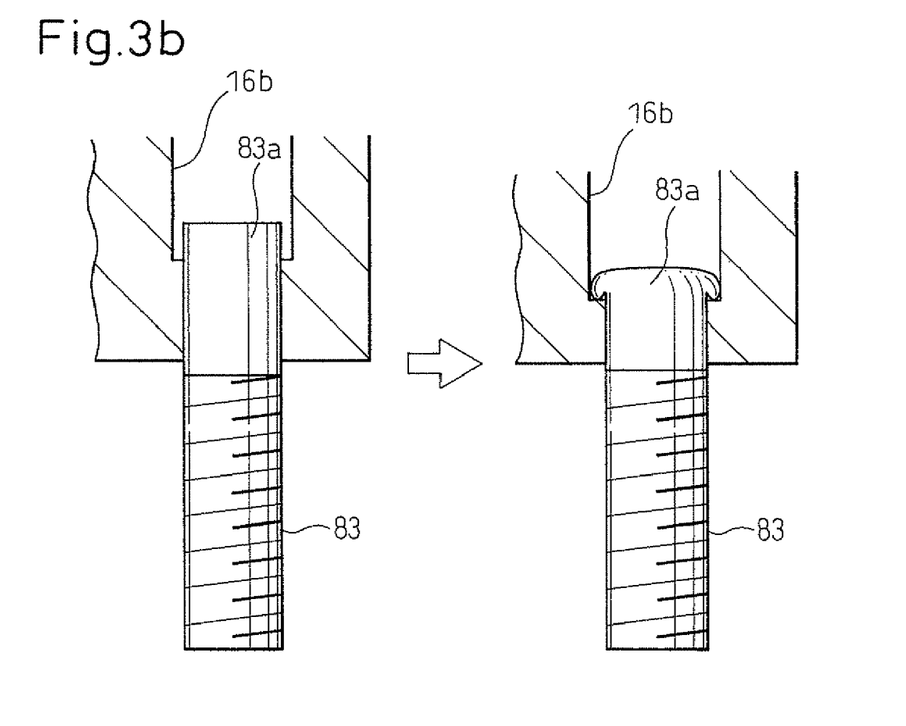
FIG. 3b is a detailed view showing details of a caulking structure.

If such a structure is not adopted, the flange 3 and the rear cover 16 would be separated from each other by a gap equivalent to a bolt's head since the head is positioned between the flange 3 and the rear cover 16. On the contrary, according to the present invention, the head portion 83a of the bolt 83 is positioned in the rear cover 16 and further caulked under pressure. As a result, according to the present invention, it is possible to minimize a distance between the flange 3 and the rear cover 16 as possible, allowing the whole socket 10 with the built-in conduit 2 to be small sized. Due to the above-mentioned constitution, it is possible to make a moment applied on a distal end of the socket 10 smaller.

Figure 4:
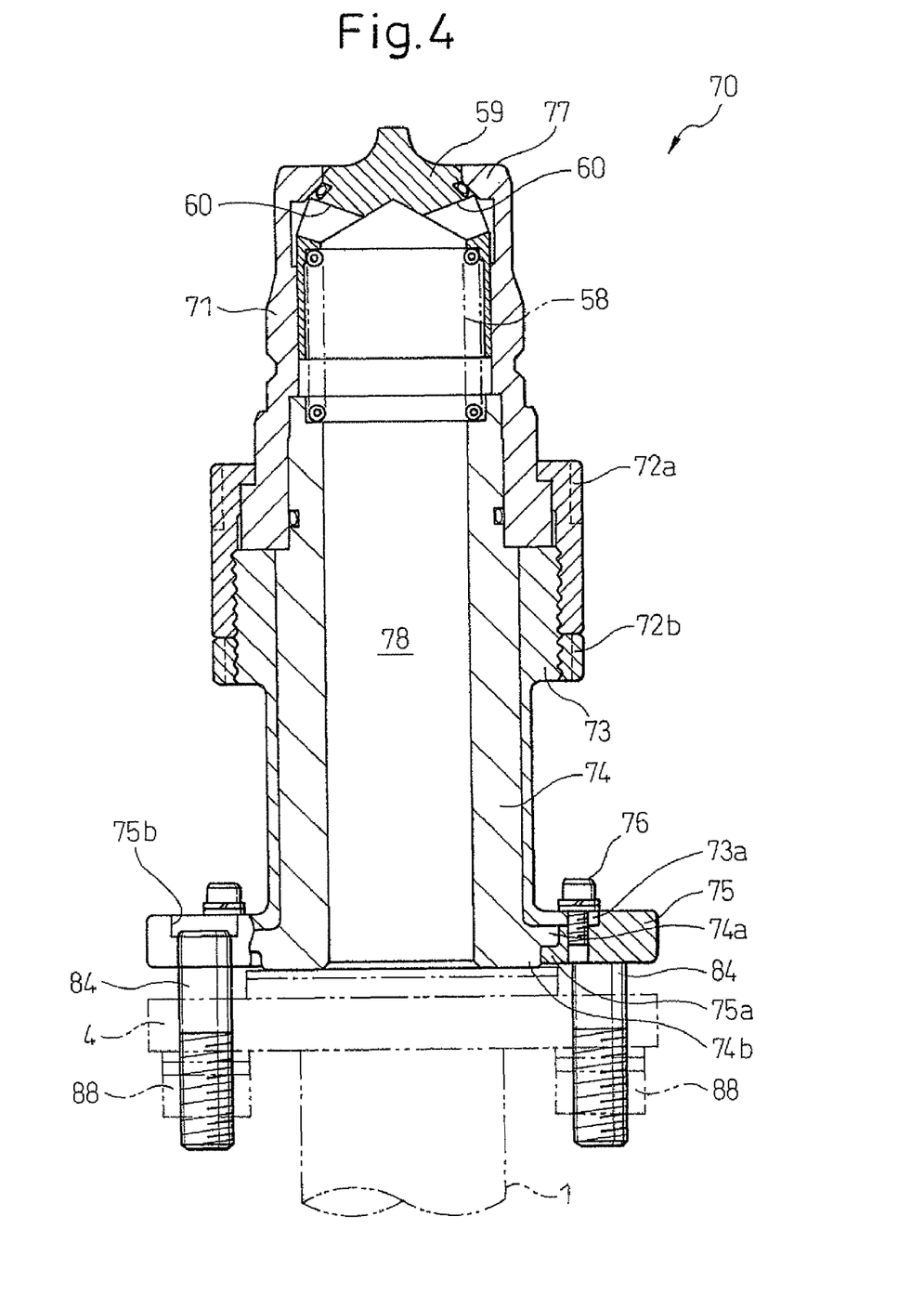
FIG. 4 is a longitudinal sectional view of a plug for the fluid-transfer coupling device in accordance with the present invention.

FIG. 4 is a longitudinal sectional view of a plug for the fluid-transfer coupling device in accordance with the present invention. The plug 70 of the invention includes a resinous inner spacer 74 having an inner passage 78 formed therein and a metal plug collar 73 covering the outer circumference portion of the inner spacer 74. As can be seen from FIG. 4, the inner spacer 74 has a flange 74a formed apart from a proximal end 74b of the inner spacer 74 at a predetermined distance. The plug collar 73 is also provided, at a proximal end thereof, with a proximal-end flange 73a. The plug 70 is also provided with a metal plug flange 75. The plug flange 75 has a step part 75a formed around an opening at the center of the flange 75 to match respective profiles of the flange 74a and the proximal end 74b of the inner spacer 74.

Accordingly, when the inner spacer 74 is inserted into the plug collar 73, the flange 74a of the inner spacer 74 abuts on the proximal-end flange 73a of the plug collar 73 and comes to a standstill. Then, the forward end of the inner spacer 74 partially projects beyond the forward end of the plug collar 73. Then, from the proximal end of plug flange 75, the plug flange 75 is fitted to the plug collar 73 and successively, the plug collar 73 and the plug flange 75 are joined to each other by bolts 76. As a result, the flange 74a of the inner spacer 74 is securely pinched between the proximal-end flange 73a of the plug collar 73 and the step part 75a of the plug flange 75. Then, a plug forward part 71 is inserted in the forward end of the inner spacer 74 and thereafter, the part 71 and the inner spacer 74 are fixed to each other by double nuts 72a, 72b.

In the not-shown prior art, the plug flange is composed of two half-moon shaped members in assembly. On the contrary, according to the present invention, the plug flange 75 can be formed by a single component due to the above-mentioned constitution. In other words, according to the invention, there is no need of providing the plug flange 75 composed of two divided parts, so that the manufacturing cost of the plug 70 can be saved. Additionally, with the above-mentioned constitution, if the plug flange 75 is damaged, it is possible to easily replace it with another flange and also possible to exchange it for another plug flange 75' of a different standard (diameter), for example, JIS•ANSI•DIN.

In the present invention, the outer circumference portion of the plug 70 is reinforced by the metal plug collar 73 and the plug flange 75, especially by the plug collar 73. Consequently, comparing with an entire resinous plug (not shown) in the prior art, the plug 70 of the invention is enhance in its rigidity. Thus, even if transferring a large quantity of fluid on condition that the plug 70 is inserted into the socket 10 as described later, the plug 70 is stably supported in the socket 10 and, it is possible to prevent a breakage of plug 70.

As shown in FIG. 4, the tip of the plug forward part 71 is in the form of a second valve seat 77 projecting inwardly. A second valve body 59 is urged toward the second valve seat 77 by a spring 58 disposed between the second valve body 59 and the forward end of the inner spacer 74. In the normal state, the second valve body 59 closes an opening of the second valve seat 77. Additionally, as shown in the figure, the second valve 59 is formed with a communication hole 60. When the second valve 59 is pushed against the urging of the spring 58, the communication hole 60 and the opening of the second valve seat 77 are opened together.

Note, a conduit 1 having a flange 4 is connected to the proximal end of the plug 70. The connection between the plug 70 and the conduit 1 is accomplished by means of bolts 84 and nuts 88. Respective head portions of the bolts 84 are arranged in holes 75*b* of the plug flange 75 and also caulked as similar to the structure mentioned with reference to FIG. 3*b*. As a result, in the present invention, it is possible to prevent the head portions of the bolts 84 from projecting from the surface of the plug flange 75 toward the forward end of the plug 70, facilitating an operator's grasping of the plug 70.

Figure 5:
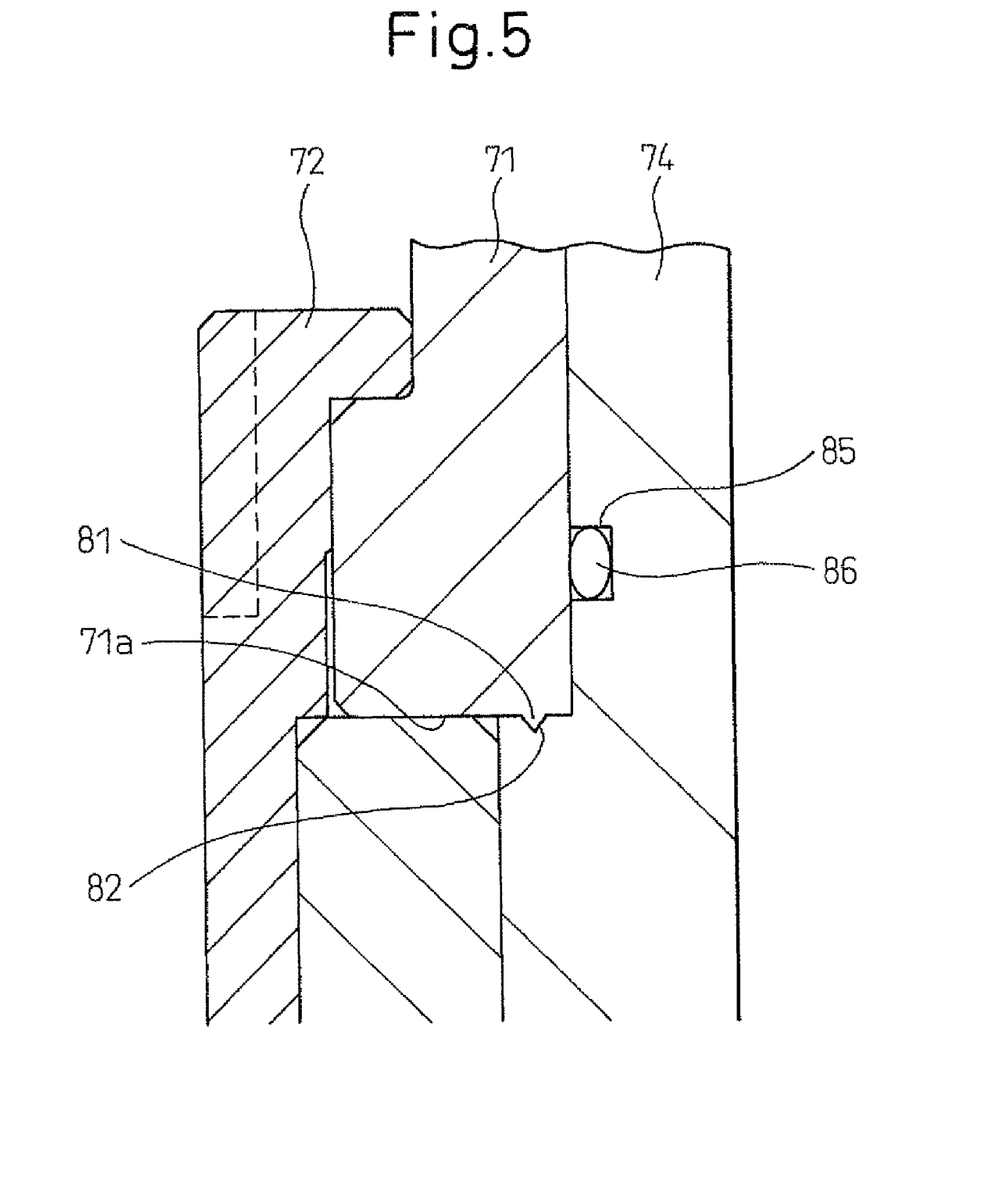
FIG. 5 is a partially-enlarged view showing a part of the plug in enlargement.

FIG. 5 is a partially-enlarged view showing a part of the plug in enlargement. As shown in FIG. 5, the inner spacer 74 is formed, on its outer circumferential surface, with a circular recess 85 in which a sealing part 86, for example, an O-ring is arranged. As shown in the figure, the sealing part 86 serves to prevent fluid from leaking out through a clearance between the plug forward part 71 and the inner spacer 74.

On the proximal end 71*a* of the plug forward part 71, a circular projection 81 projecting in the axial direction is formed in the circumferential direction of the part 71. A portion of the inner spacer 74 corresponding to the annular projection 81, may be formed with an annular recess 82 for receiving the annular projection 81. In this case, as shown in the figure, the annular projection 81 and the annular recess 82 are together formed outside the sealing part 86 in the radial direction. Thus, even if the fluid leaks out over the sealing part 86, the fluid can be prevented from leaking by the annular projection 81 and the annular recess 82.

Figure 6:
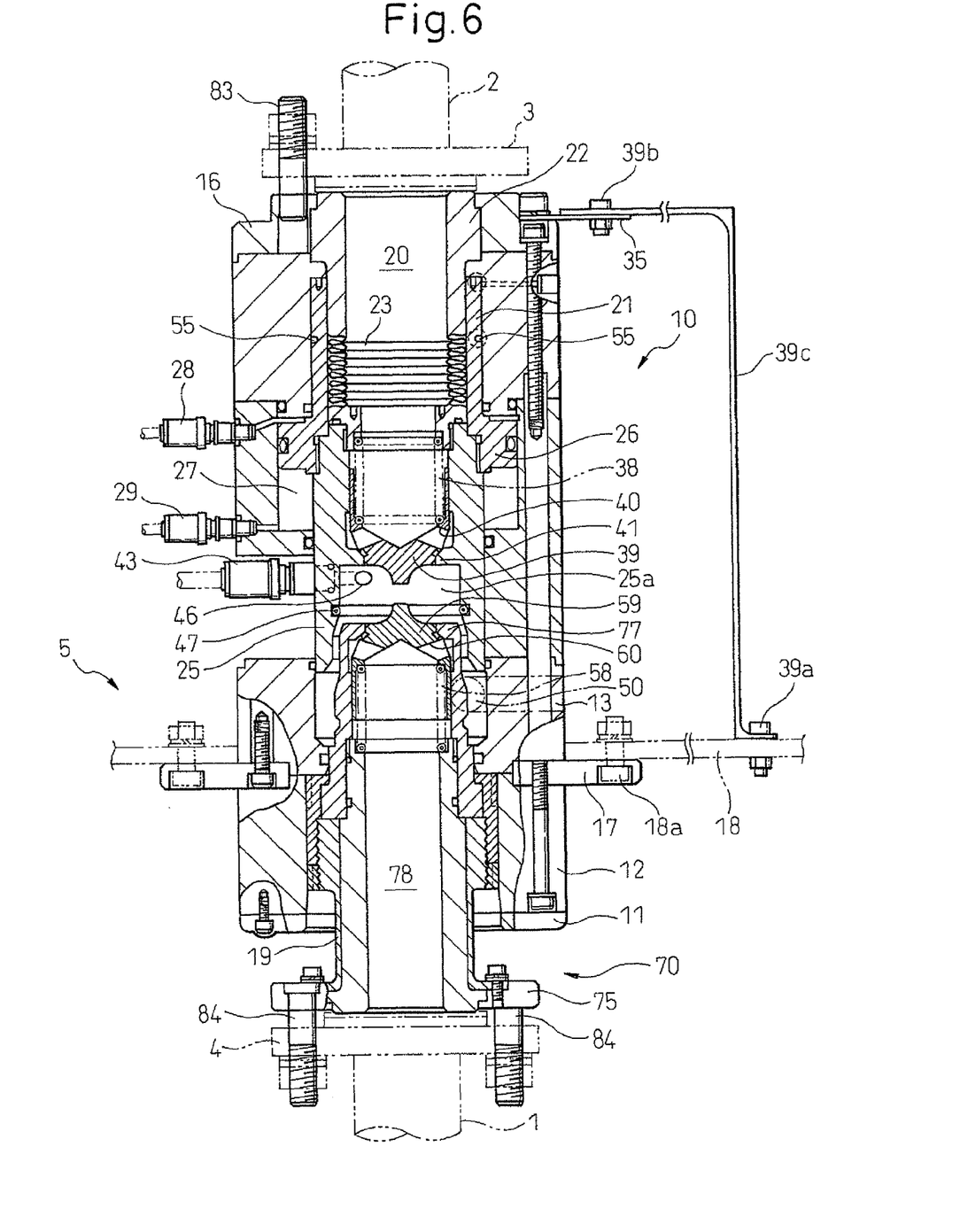
FIG. 6 is a longitudinal sectional view of the fluid-transfer coupling device, showing a condition where the plug is connected to the socket.
Figure 7:
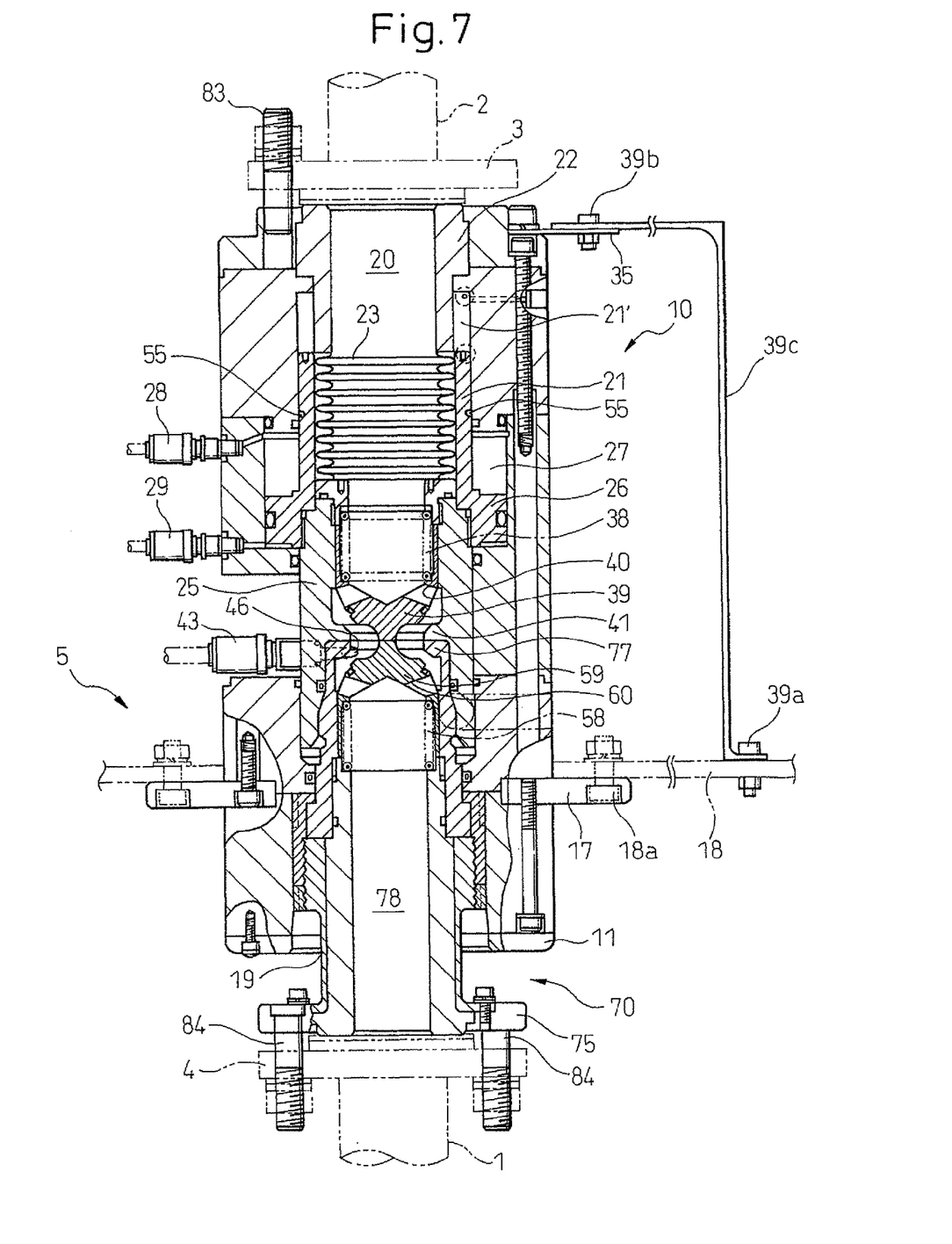
FIG. 7 is a longitudinal sectional view of the fluid-transfer coupling device, showing a condition where fluid can flow.

The operation of the fluid-transfer coupling device in accordance with the present invention will be described below. FIGS. 6 and 7 are longitudinal sectional views of the fluid-transfer coupling device, showing one condition to connect the plug with the socket and another condition to allow a circulation of fluid, respectively.

First of all, the side flange 17 of the socket 10 is attached to the mount panel 18 and further fixed thereto by the bolts/nuts 18*a*. Then, the support plate 35 of the rear cover 16 is fixed to one end of a support shaft 39*c* by a bolt/nut 39*c*. The support shaft 39*c* is formed by a substantially L-shaped member whose other end is fixed to the mount panel 18 by a bolt/nut 39*a*. The other end of the support shaft 39*c* may be fixed to a not-shown exterior member. Alternatively, the support shaft 39*c* may be formed to have the other configuration.

Then, the plug 70 connected to the conduit 1 is inserted into the entry 19 of the socket 10. Consequently, as shown in the figure, the forward end of the double nut 72*a* of the plug 70 abuts on the end surface of the housing component 13, so that the plug forward part 71 of the plug 70 projects into the housing component 13 and the shower ring 25.

As shown in the figure, when the plug 70 is inserted into the socket 10, there is produced a predetermined gap between the front cover 11 of the socket 10 and the plug flange 75 of the plug 70. This gap is enough large to receive a human's finger. Thus, in the present invention, since this structure facilitates an operator's grasping of the plug, it is possible for the operator to easily perform plugging/unplugging operations of the plug 70.

Then, when air is supplied from the intake/exhaust port 28 into the sliding chamber 27, the piston 26 slides toward the forward end of the chamber 27, together with the bellows holder 21 and the shower ring 25 both integrated with the piston 26. Then, after the outer circumferential surface of the plug forward part 71 abuts on the sealing part 47, the first valve body 39 and the second valve body 59 push one another against the springs 38, 58. Consequently, the first valve seat 41 and the second valve seat 77 abut with each other, so that both the communication hole 40 and the communication hole 60 are opened together. As a result, the fluid supplied through the conduit 1 is transferred to the conduit 2 through the inner passage 20 in the proximal end adaptor 22.

As mentioned before, according to the present invention, the side flange 17 is fixed to the mount panel 18 and the socket 10 is supported by the mount panel 18 through the use of the support plate 35 and the support shaft 39*c*. Therefore, even if the flow rate of fluid is relatively large when transferring the fluid, the socket 10 is stably supported by the mount panel 18. Thus, due to load applied between the side flange 17 and the mount panel 18, it is possible to allow these elements to retain the sealing characteristics for the long term.

After transferring a desired quantity of fluid, air is supplied from the intake/exhaust port 29 into the sliding chamber 27, so that all of the piston 26, the bellows holder 21 and the shower ring 25 slide toward the proximal end of the socket 10 for respective initial positions. As a result, the first valve body 39 and the second valve body 59 are separated from each other and seated on the first valve seat 41 and the second valve seat 77 due to the urging action of the springs 38, 58, respectively. Thus, the communication holes 40, 60 are together closed to complete the transfer of fluid.

It is also possible to clean up the cleaning chamber 25*a* of the shower ring 25 when the piston 26 etc. is positioned in the initial position. After the cleaning water is jet-sprayed from the shower nozzle 43, the cleaning water flows toward the forward end of the shower ring 25 in a spiral whirl along the inner surface of the ring 25 since the nozzle hole 46 is orientated in the tangential direction of the inner surface of the ring 25. Then, after reaching the tapered surface, the cleaning water advances along the outer circumferential surface of the plug 70. In this way, the outer circumferential surface of the plug 70 is cleaned up by such vigorous cleaning water, exhaustively and certainly. Thereafter, the cleaning water is led to the forward end along the tapered surface and further discharged from the drain hole 50.

Note, as can be seen from FIG. 1, even when the piston 26 is in its retracted position, the cleaning chamber 25a is positioned somewhat apart from the sliding chamber 27 in the longitudinal direction. When the piston 26 slides to the furthest position (see FIG. 7), the cleaning chamber 25a further departs from the sliding chamber 27. Thus, according to the present invention, there is no possibility that lubricant in the sliding chamber 27, for example, grease flows into the cleaning chamber 25a.

In addition, although the support plate 35 and the support shaft 39c are respectively formed by different members in the above-mentioned embodiment, an arrangement where the support plate 35 and the support shaft 39c are united to one integrated member would be contained in the scope of the present invention.

Figure 8:
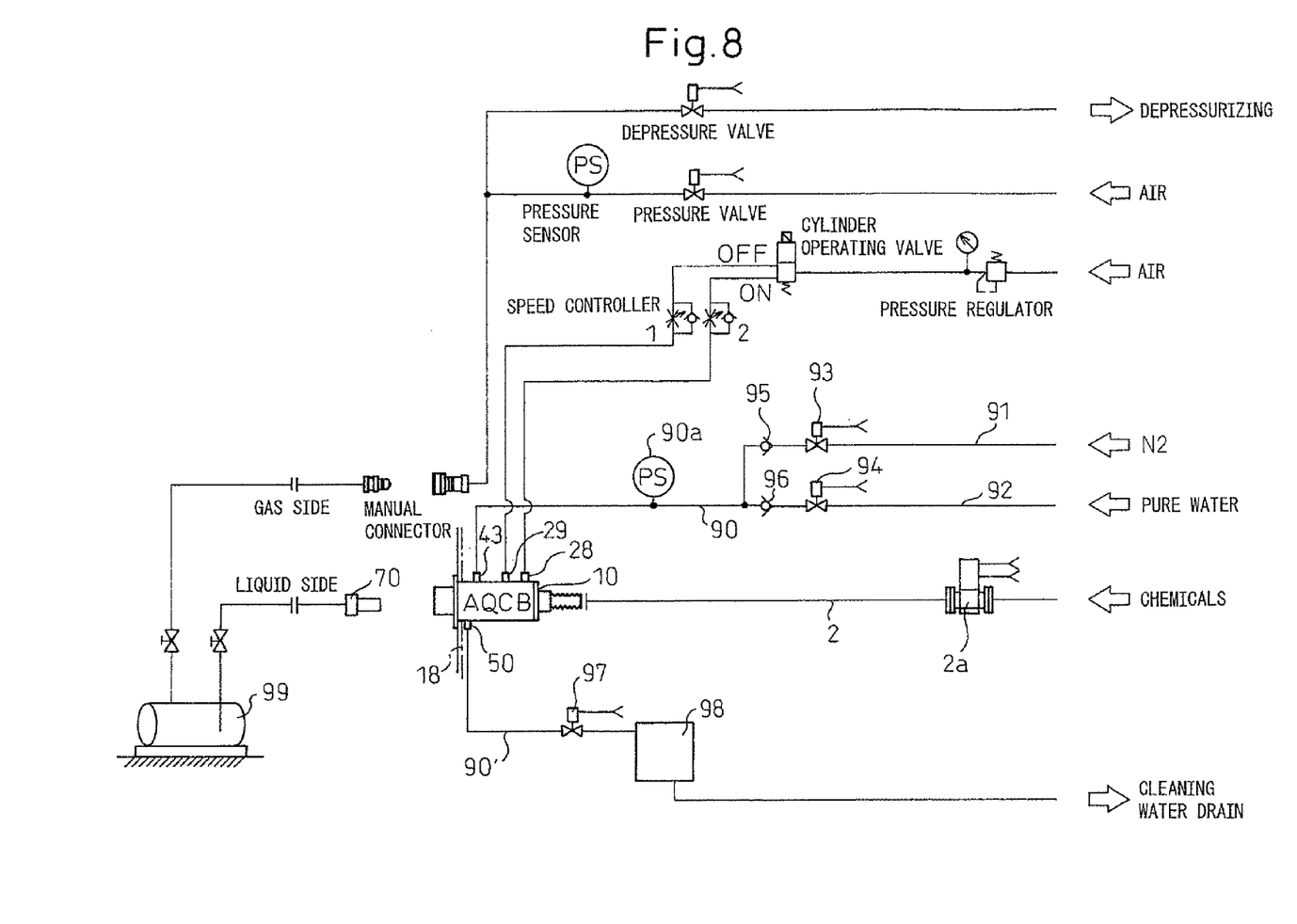
FIG. 8 is a flow diagram in which the coupling device of the present invention is arranged.

FIG. 8 is a flow diagram including the coupling device of the present invention. In FIG. 8, the conduit 2 extended from the socket 10 is connected to a chemical source through a supply valve 2a. On the other hand, the conduit 1 extended from the plug 70 is connected to a carrier tank 99 through a valve. Thus, when the coupling device in which the plug 70 is connected to the socket 10, is used, chemicals are supplied to the carrier tank 99 through the socket 10 and the plug 70. In addition, the intake/exhaust ports 28, 29 are respectively connected to an air source through respective speed controllers, a cylinder operating valve and a pressure regulator, as shown in the figure.

A pipe 90 interposing a pressure sensor 90a is connected to the shower nozzle 43. As shown in the figure, the pipe 90 is branched to a nitrogen branch pipe 91 and a pure-water branch pipe 92. The branch pipe 91 interposes a check valve 95 and a stop valve 93, while the branch pipe 92 interposes a check valve 96 and a stop valve 94. Further, a pipe 90' extended from the drain hole 50 interposes a drain valve 97 and a drain trap 98 and is connected to a cleaning-water drain.

When cleaning the shower ring 25 in the socket 10, the stop valve 94 is opened to allow purified water to flow through the branch pipe 92 and the pipe 90. Then, the pure water is supplied from the shower nozzle 43 to the cleaning chamber 25a of the shower ring 25. In the present invention, since the check valves 95, 96 are interposed in the branch pipes 91, 92 respectively, there is no possibility that the pure water flowing through the branch pipe 92 during cleaning flows into the upstream side of the branch pipe 91 over the check valve 95.

After cleaning up the cleaning chamber 25a and the outer circumference of the plug 70, the pure water is supplied to the drain trap 98 through the pipe 90' from the drain hole 50. It is noted that after using the socket 10 in order to feed a specific chemicals, the chemicals may stick to the inner wall of the cleaning chamber 25a and the outer circumference surface of the plug 70 as residual. According to the present invention, this residual is swept away by the purified water and successively, the waste fluid containing the residual is trapped by the drain trap 98.

After completing the cleaning operation, the stop valve 94 in the branch pipe 92 is closed and the stop valve 93 in the branch pipe 91 is opened. After that, nitrogen gas is fed through the branch pipe 91 and the pipe 90 and supplied into the cleaning chamber 25a from the shower nozzle 43. In this situation, the check valve 96 in the branch pipe 92 also serves to prevent nitrogen gas from flowing into the upstream side of the branch pipe 92 over the check valve 96. The purified water remaining in the cleaning chamber 25a is swept away through the drain hole 50 due to the supply of nitrogen gas and subsequently trapped by the drain trap 98. Alternatively, the cleaning pure water is vaporized in the cleaning chamber 25a. Thereafter, by closing the stop valve 93, the socket 10 can be brought into a reusable condition. In this connection, it is obvious that the chemicals from the carrier tank 99 can be supplied to the socket 10 and members on the side of the socket 10 in the same way.

Figure 9:
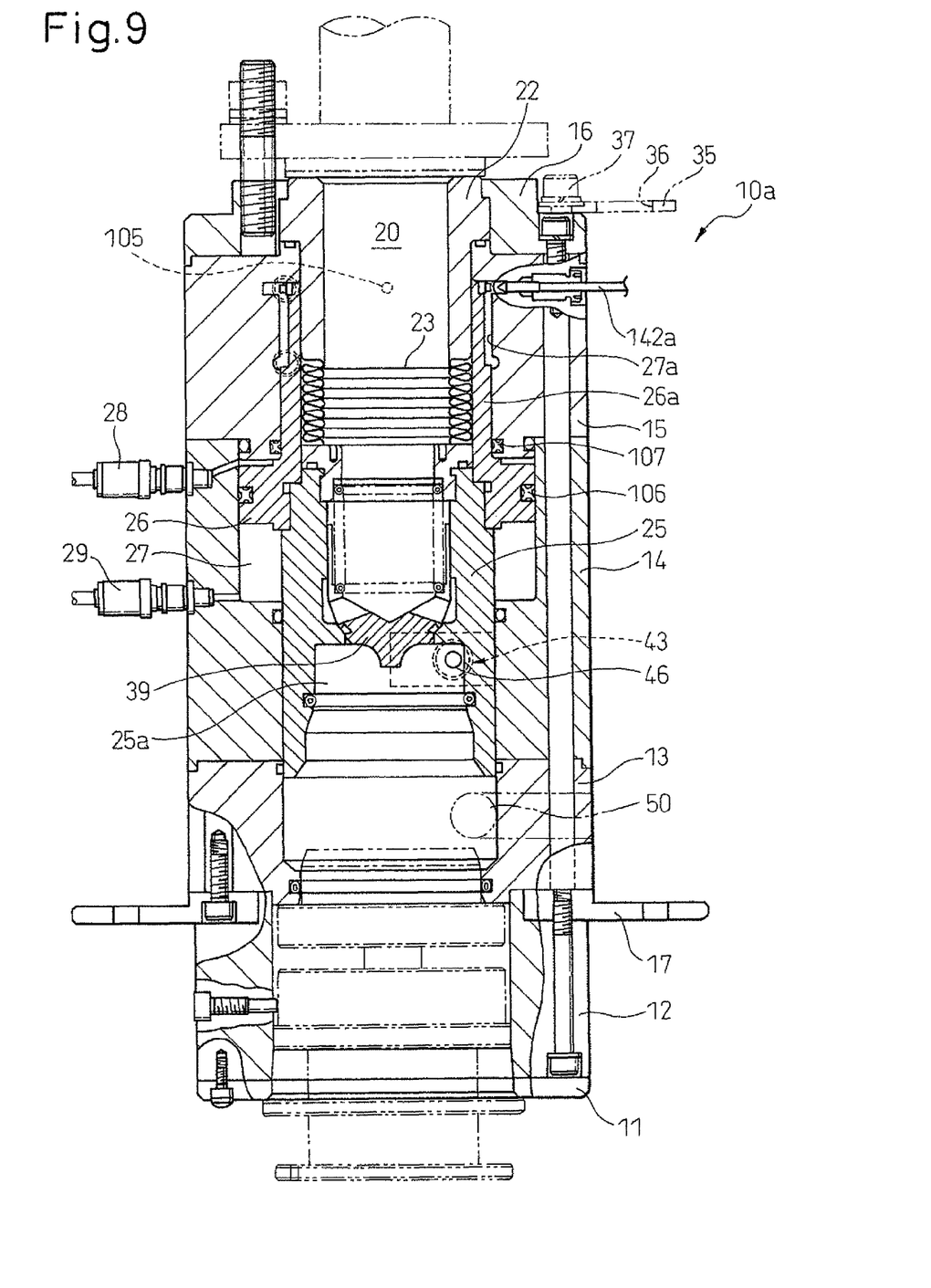
FIG. 9 is a longitudinal sectional view of the socket in accordance with another embodiment of the present invention.
Figure 10:
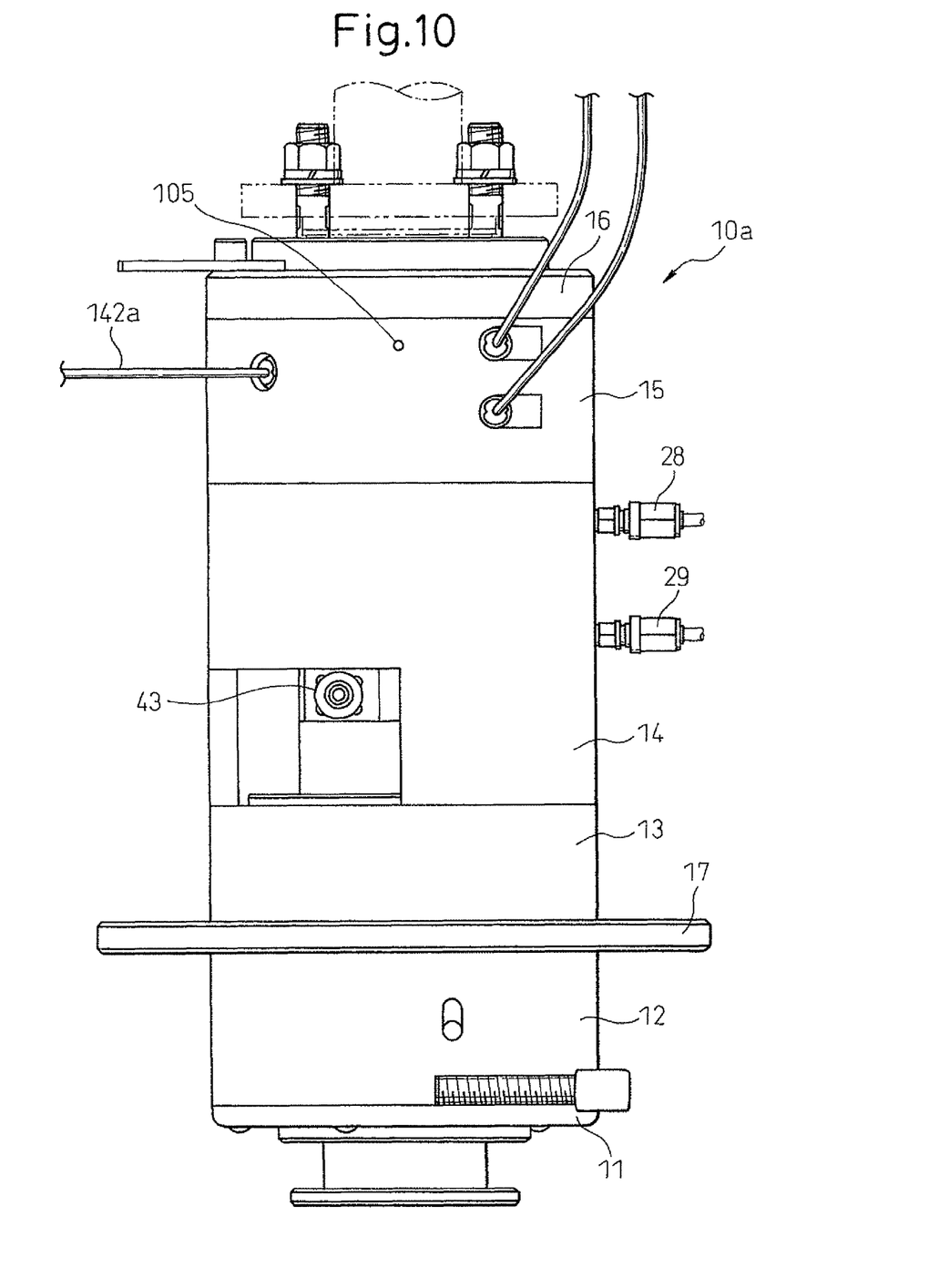
FIG. 10 is a back view of the socket shown in FIG. 9.
Figure 11:
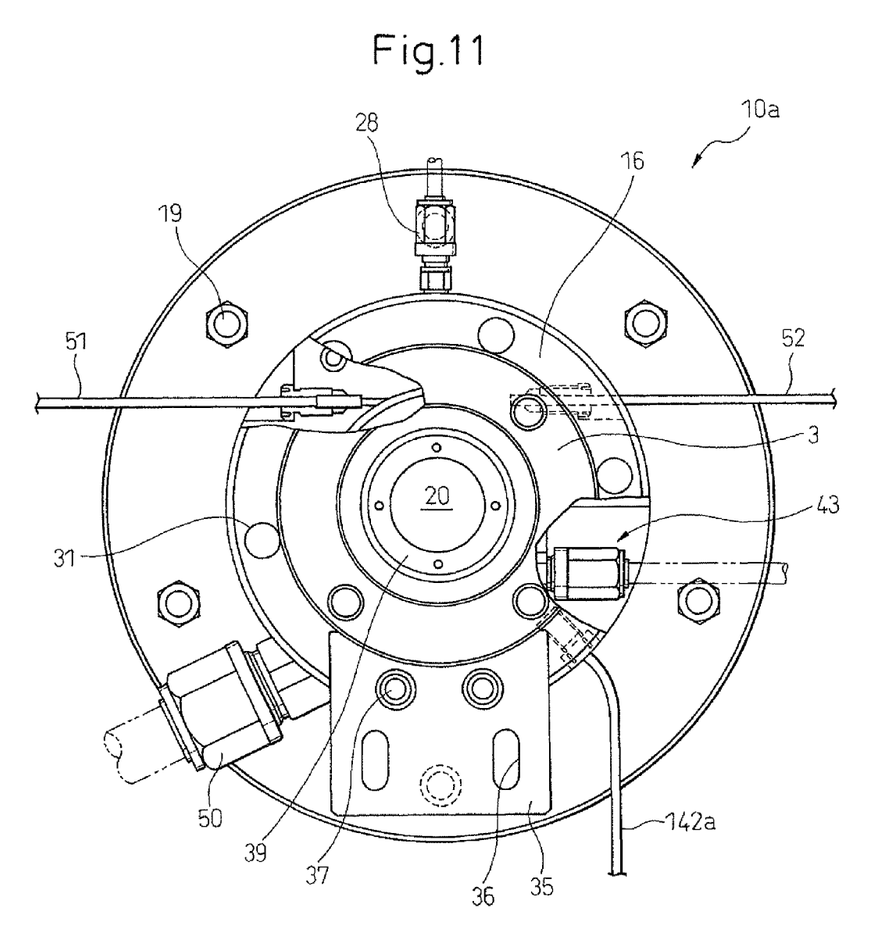
FIG. 11 is an end view of the socket shown in FIG. 9.

FIG. 9 is a longitudinal sectional view of the socket in accordance with another embodiment of the present invention. FIG. 10 is a back view of the socket shown in FIG. 9, while FIG. 11 is an end view of the socket shown in FIG. 9. In the socket 10a shown in these figures, a leak sensor 142a is arranged in a position corresponding to the drain 42 shown in FIG. 1. This leak sensor 142a serves to detect the presence of fluid flowing into one portion 27a of the sliding chamber 27 corresponding to a proximal end portion 26a of the piston 26. In other words, in this embodiment, the socket is constructed so that the leak sensor 142a detects fluid leaking out of the inner passage 20 in place of discharging the fluid from the drain 42.

Additionally, as shown in FIG. 9, in one portion 27a of the sliding chamber 27, a through-hole 105 is formed to communicate with the outside of the socket 10a. In operation, when the proximal end portion 26a of the piston 26 is sliding on the portion 27a of the sliding chamber 27, the through-hole 105 serves to prevent air from being compressed in the portion 27a of the sliding chamber 27. In other words, the through-hole 105 helps to slide the proximal end portion 26a in the portion 27a of the sliding chamber 27.

Further, as can be seen from FIGS. 9 to 11, the nozzle hole 46 of the shower nozzle 43 is positioned on the backside of the socket 10a. As is known, the socket 10a is generally arranged so that the inner passage 20 extends horizontally. With this arrangement of the socket 10a, the nozzle hole 46 of the shower nozzle 43 opens laterally in the cleaning chamber 25a. It will be understood that when adopting the above arrangement, an entry of foreign materials, such as dust, into the shower nozzle 43 through the nozzle hole 46 could be suppressed in comparison with an arrangement where the nozzle hole 46 opens upward.

Further, as shown in FIG. 9, seal members 106, 107 are arranged in the outer circumferential surface of the piston 26 and the inner circumferential surface of the housing component 15, respectively. These seal members 106, 107 serve to prevent a leakage of air during sliding of the piston 26. Preferably, these seal members 106, 106 are formed with X-shaped sections. In this case, it is possible to prevent leakage of air while maintaining the sliding performance of the piston 26, in comparison with a case in which the seal members are an O-rings.

DESCRIPTION OF NOTATIONS

10 Socket
11 Front Cover
12, 13, 14, 15 Housing Component
14a Step Part
15a Circular Groove
15b Forward End
16 Rear Cover
16a Circular Projection
16b Hole
17 Side Flange (Mount Panel Attachment)
18 Mount Panel
19 Entry
20 Inner Passage
21 Bellows Holder
21' Sliding Chamber for Bellows Holder
22 Proximal End Adaptor
22a Broad Portion 23 Bellows
24 Step Part
25 Shower Ring
25a Cleaning Chamber
26 Piston
27 Sliding Chamber
28 Intake/Exhaust port
28, 29 Intake/Exhaust Nozzle
31, 32 Bolt
33 Connecting Rod
35 Support Plate (Support)
38 Spring
39 First Valve Body (Conduction Valve Mechanism)
39c Support Shaft (Support)
40 Communication Hole (Conduction Valve Mechanism)
41 First valve Seat (Conduction Valve Mechanism)
42 Drain
43 Shower Nozzle
46 Nozzle Hole
47 Sealing Part
50 Drain Hole
51, 52 Position Sensor
55 Reference Mark
58 Spring
59 Second Valve Body
60 Communication Hole
70 Plug
71 Plug Forward Part
71a Proximal End
72a, 72b Double Nut
73 Plug Collar
73a Proximal-end Flange
74 Inner Spacer
74a Flange
74b Proximal End
75 Plug Flange
75a Step Part
75b Hole
76 Bolt
77 Second Valve Seat
78 Inner Passage
81 Circular Projection
82 Circular Recess
105 Through-hole
106, 107 seal member
142a Leak Sensor

The invention claimed is:

1. A socket for a fluid-transfer coupling device that connects the socket and a plug to each other thereby communicating respective flow paths in the socket and the plug with each other, comprising:

a mount panel attachment attached to a mount panel and arranged on a first end of the socket, on which an entry of the socket allowing the plug to be inserted thereinto is formed, allowing attachment of the socket to the mount panel; and a support that supports the socket, wherein the support includes a support plate attached to a second end of the socket and a support shaft connecting the support plate to the mount panel attached to the mount panel attachment.

2. A socket for a fluid-transfer coupling device, which includes a bellows holder for supporting a bellows and a shower ring fixed to the bellows holder both arranged in a housing so as to be slidable in a longitudinal direction of the housing, the bellows having a conduction valve mechanism arranged in the shower ring at the forward end of the bellows, the shower ring including a circular-sectional cleaning chamber allowing an entrance of a head portion of a plug to be coupled to the socket, the plug having a conduction valve mechanism corresponding to the conduction valve mechanism of the bellows at the forward end of the plug, the shower ring having seal means arranged in the middle of the cleaning chamber and a nozzle hole formed in a sidewall of the cleaning chamber to extend in the tangential direction thereto, the housing having a shower nozzle arranged to supply the nozzle hole with a washing water and a drain hole formed to discharge the water, the socket comprising:

a mount panel attachment arranged on a first end of the socket, on which an entry of the socket allowing the plug to be inserted thereinto is formed, allowing attachment of the socket to the mount panel; and a support that supports the socket, wherein the support includes a support plate attached to a second end of the socket and a support shaft connecting the support plate to the mount panel attached to the mount panel attachment.

3. The socket for the fluid-transfer coupling device of claim 2, further comprising a position sensor for detecting the position of the bellows holder, wherein the position sensor is arranged in a position where a pressure is unchangeable when the bellows holder slides.

4. The socket for the fluid-transfer coupling device of claim 2, further comprising a leak sensor for detecting a leakage of fluid to be transferred by the fluid-transfer coupling device, into a sliding chamber allowing the bellows holder to slide therein.

5. A socket for a fluid-transfer coupling device of claim 2 wherein the sealing means of the shower ring is an O-ring.

* * * * *